(12) United States Patent
Aragon

(10) Patent No.: US 8,798,022 B1
(45) Date of Patent: *Aug. 5, 2014

(54) MULTIPATH-AWARE TRANSMISSION PARAMETER ADAPTION SYSTEMS, DEVICES AND METHODS

(75) Inventor: David Aragon, Berkeley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/534,851

(22) Filed: Jun. 27, 2012

(51) Int. Cl.
*H04W 4/00* (2009.01)
*H04J 11/00* (2006.01)

(52) U.S. Cl.
USPC .......................................... 370/338; 370/206

(58) Field of Classification Search
USPC .................. 370/338, 204, 206, 208, 343, 344
See application file for complete search history.

(56) References Cited

U.S. PATENT DOCUMENTS

| | | | |
|---|---|---|---|
| 6,674,403 B2 | 1/2004 | Gray et al. | |
| 7,969,374 B1 * | 6/2011 | Thommana et al. | 343/755 |
| 2010/0232311 A1 * | 9/2010 | Zhang et al. | 370/252 |
| 2010/0260083 A1 | 10/2010 | Liao et al. | |
| 2011/0143683 A1 * | 6/2011 | Sridhara et al. | 455/67.16 |
| 2012/0214509 A1 * | 8/2012 | Levin et al. | 455/456.1 |
| 2013/0023278 A1 * | 1/2013 | Chin | 455/456.1 |
| 2013/0172020 A1 * | 7/2013 | Aweya et al. | 455/457 |

OTHER PUBLICATIONS

Co-pending U.S. Appl. No. 13/435,789, filed Mar. 30, 2012, 29 pages.
Judd, G. et al., Efficient Channel-Aware Rate Adaptation in Dynamic Environments, *MobiSys'08*, Jun. 17-20, 2008, 14 pages.
Lacage, M. et al., IEEE 802.11 Rate Adaptation: A Practical Approach, *MSWiM'04*, October 406, 2004, 9 pages.

* cited by examiner

*Primary Examiner* — Brian D Nguyen
(74) *Attorney, Agent, or Firm* — Cooley LLP

(57) ABSTRACT

A non-transitory processor-readable medium storing code representing instructions to be executed by a processor includes code to cause the processor to receive from a wireless access point (WAP) device frequency-domain data associated with signals received at the WAP device from a wireless device during a time period. The code includes code to determine multiple frequency-domain magnitudes associated with the frequency-domain data for the time period to define a spectral magnitude signature associated with the frequency-domain data. Each frequency-domain magnitude from the multiple frequency-domain magnitudes is uniquely associated with a frequency bin from multiple mutually-exclusive frequency bins associated with the frequency domain data. The code also includes code to identify a spectral response deviation associated with the spectral magnitude signature and send a parameter indicator to the WAP device based on the spectral response deviation such that a wireless communications parameter value at the WAP device is changed.

20 Claims, 11 Drawing Sheets

Wireless Communications Parameters

| MCS index | Spatial streams | Modulation type | Data rate (Mbit/s) | | | |
|---|---|---|---|---|---|---|
| | | | 20 MHz channel | | 40 MHz channel | |
| | | | 800 ns GI | 400 ns GI | 800 ns GI | 400 ns GI |
| 0 | 1 | BPSK | 6.50 | 7.20 | 13.50 | 15.00 |
| 1 | 1 | QPSK | 13.00 | 14.40 | 27.00 | 30.00 |
| 2 | 1 | QPSK | 19.50 | 21.70 | 40.50 | 45.00 |
| 3 | 1 | 16-QAM | 26.00 | 28.90 | 54.00 | 60.00 |
| 4 | 1 | 16-QAM | 39.00 | 43.30 | 81.00 | 90.00 |
| 5 | 1 | 64-QAM | 52.00 | 57.80 | 108.00 | 120.00 |
| 6 | 1 | 64-QAM | 58.50 | 65.00 | 121.50 | 135.00 |
| 7 | 1 | 64-QAM | 65.00 | 72.20 | 135.00 | 150.00 |
| 8 | 2 | BPSK | 13.00 | 14.40 | 27.00 | 30.00 |
| 9 | 2 | QPSK | 26.00 | 28.90 | 54.00 | 60.00 |
| 10 | 2 | QPSK | 39.00 | 43.30 | 81.00 | 90.00 |
| 11 | 2 | 16-QAM | 52.00 | 57.80 | 108.00 | 120.00 |
| 12 | 2 | 16-QAM | 78.00 | 86.70 | 162.00 | 180.00 |
| 13 | 2 | 64-QAM | 104.00 | 115.60 | 216.00 | 240.00 |
| 14 | 2 | 64-QAM | 117.00 | 130.00 | 270.00 | 270.00 |
| 15 | 2 | 64-QAM | 130.00 | 144.40 | 270.00 | 300.00 |
| 16 | 3 | BPSK | 19.50 | 21.70 | 40.50 | 45.00 |
| 17 | 3 | QPSK | 39.00 | 43.30 | 81.00 | 90.00 |
| . | . | . | . | . | . | . |
| . | . | . | . | . | . | . |
| . | . | . | . | . | . | . |

FIG. 4

Spectral Response Table
240

| Compute Environment | Spectral Response Deviations |
|---|---|
| CE1 | S1 |
| CE2 | S2 |
| CE3 | S3 |
| CE4 | S4 |

FIG. 8

| Spectral Response Table 242 | |
|---|---|
| Communications Parameter Indicator | Compute Environment |
| SP1 | CE1 |
| GI1 | CE1 |
| MT1 | CE2 |
| GI2 | CE2 |
| SP2 | CE3 |
| GI1 | CE3 |
| MT2 | CE4 |
| GI2 | CE4 |

FIG. 9

MULTIPATH-AWARE TRANSMISSION PARAMETER ADAPTION SYSTEMS, DEVICES AND METHODS

CROSS-REFERENCE TO RELATED APPLICATIONS

This application is related to co-pending U.S. patent application Ser. No. 13/435,789, filed on Mar. 30, 2012 and entitled "Multipath-Aware Wireless Device Location Identifier Systems, Devices and Methods," the disclosure of which is incorporated herein by reference in its entirety.

BACKGROUND

Some embodiments described herein relate generally to systems and methods for changing or adapting a wireless communications parameter at a wireless access point device based on the type of compute environment in which the wireless access point device is disposed.

Some known systems and methods for adaption of wireless communications parameters at a wireless access point device include pre-loaded software programs at the access point device that follow a standard protocol based on the IEEE 802.11n wireless communication standard. Such programs do not take into account the type of compute environment in which the access point device is located. For example, in some such programs, as signal quality decreases (e.g., the data rate decreases), a particular sequence or preplanned iterative steps are performed to improve the signal quality at the access point device without regard to the type of compute environment in which the access point device is operating.

Accordingly, a need exists for devices and methods for identifying the type of compute environment in which a WAP device is disposed and providing an indication to the WAP device that a particular wireless communications parameter value at the WAP device should be changed to achieve improved performance such as improved signal quality and/or greater data transfer rate.

SUMMARY

A non-transitory processor-readable medium storing code representing instructions to be executed by a processor includes code to cause the processor to receive from a wireless access point (WAP) device frequency-domain data associated with signals received at the WAP device from a wireless device during a time period. The code includes code to determine multiple frequency-domain magnitudes associated with the frequency-domain data for the time period to define a spectral magnitude signature associated with the frequency-domain data. Each frequency-domain magnitude from the multiple of frequency-domain magnitudes is uniquely associated with a frequency bin from multiple mutually-exclusive frequency bins associated with the frequency domain data. The code also includes code to identify a spectral response deviation associated with the spectral magnitude signature and send a parameter indicator to the WAP device based on the spectral response deviation such that a wireless communications parameter value at the WAP device is changed.

BRIEF DESCRIPTION OF THE DRAWINGS

FIG. 4 is a table including example wireless communications parameters at a wireless access point device.

FIG. 8 is a spectral response table associated with the spectral response appliance of FIG. 5.

FIG. 9 is another spectral response table associated with the spectral response appliance of FIG. 5.

DETAILED DESCRIPTION

Figure 1:
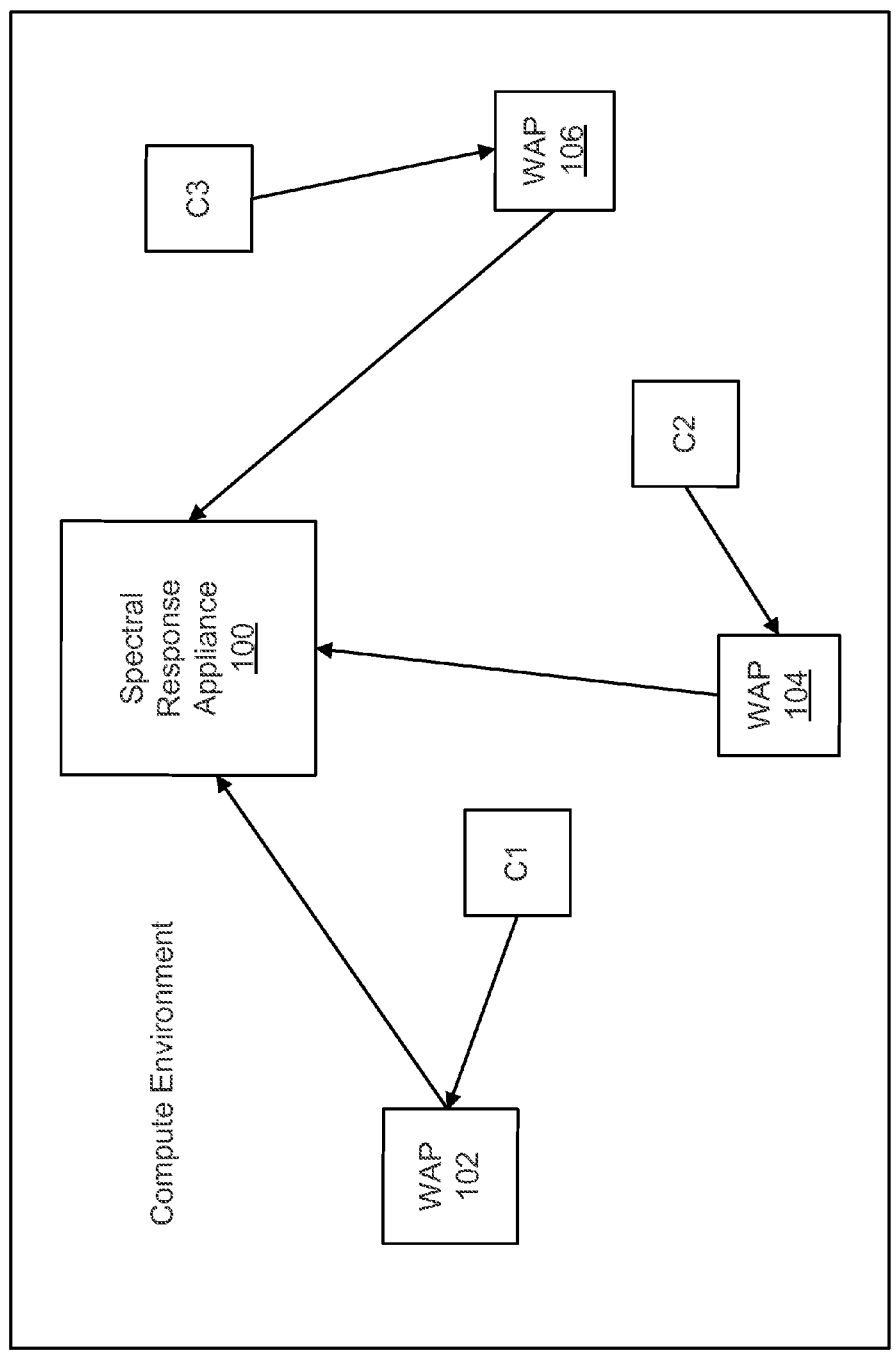
FIG. 1 is a schematic illustration of a spectral response appliance, according to an embodiment, and multiple wireless access point devices and multiple compute devices, disposed within a compute environment.

Apparatus and methods are described herein for adapting one or more wireless transmission parameters at a wireless access point device based on the compute environment in which the access point device is disposed. A spectral response appliance described herein can locate a radio frequency (RF) transmitter of a wireless device using signal strengths received at multiple wireless access point (WAP) devices or sensors, such as, for example, an orthogonal frequency division multiplexing (OFDM) receiver. The spectral response appliance can receive spectral data from transmissions between an access point device and a wireless device operating within a compute environment to derive parameters characterizing the physical transmission path. The spectral response appliance can use those parameters together with the signal strengths to provide to the WAP devices information related to the type of environment in which the WAP device is operating and/or related to a wireless communications parameter for use by the WAP devices.

Radio signal reflections, known as multipath distortion, can cause frequency-selective fading. This multipath distortion can be represented in the output of a fast Fourier transfer (FFT) integrated circuit of a WAP device as attenuation of some subcarriers relative to others. A WAP device typically includes an equalizer that can compensate (up to a point) for such attenuation so as to recover the digital data. The spectral response appliance described herein can use the frequency-selective fading data to determine a type of compute environment in which the wireless device is operating (e.g., a high multi-path environment or a low multi-path environment). Based on the type of compute environment in which the WAP device is operating, the spectral response appliance can send indicators (e.g., within signals) to the WAP device indicating that a wireless communications parameter should be changed or adapted. Such a wireless communications parameter can be associated with, for example, an IEEE 802.11n wireless communications standard.

In one embodiment, the spectral response appliance can collect frequency-domain data (also referred to as frequency-selective fading data) from the WAP device after the FFT stage and prior to an equalization process, during the time period in which the WAP device is receiving a frame (e.g., a set of date over a period of time) from a wireless device. The spectral response appliance can have an accumulator that accumulates the magnitudes of each frequency bin over the duration of the incoming frame. Typically, OFDM modulation results in a random quality to the magnitude values for each subcarrier (e.g., subcarrier frequency) over time, so the outputs from the accumulator can be approximately or substantially equal by the time the frame has been entirely received. Frequency-selective fading can be indicated by deviations from this ideal of equal spectral magnitudes. A spectral feature extractor of the spectral response appliance outputs numeric values that vary with the location and depth of the spectral nulls or shadows found in the accumulator output.

The numeric values representing the spectral features can then be combined with other data describing the frame, including, for example, the transmitter address, the received signal strength indicator (RSSI) of the frame, and the time of arrival of the frame. This combined data can be used essentially as additional sensor readings on the same transmitter, but received from different sensors.

In some embodiments, a non-transitory processor-readable medium storing code representing instructions to be executed by a processor includes code to cause the processor to receive from a WAP device frequency domain data associated with signals received at the WAP device from a wireless device during a time period. The code includes code to determine multiple frequency-domain magnitudes associated with the frequency-domain data for the time period to define a spectral magnitude signature associated with the frequency-domain data. Each frequency-domain magnitude from the multiple frequency-domain magnitudes being uniquely associated with a frequency bin from multiple mutually-exclusive frequency bins associated with the frequency domain data. The code also includes code to identify a spectral response deviation associated with the spectral magnitude signature and send a parameter indicator to the WAP device based on the spectral response deviation such that a wireless communications parameter value at the WAP device is changed.

In some embodiments, an apparatus includes a spectral response appliance configured to be coupled to a WAP device that receives from a wireless device signals during a time period. The spectral response appliance is configured to receive from a FFT integrated circuit of the WAP device frequency-domain data associated with the signals received by the WAP device from the wireless device. The spectral response appliance includes a spectral response module configured to identify a spectral response deviation associated with the frequency-domain data received from the FFT integrated circuit and send a parameter indicator based on the spectral response deviation such that the WAP device changes a wireless communications parameter value in response to the parameter indicator.

In some embodiments, an apparatus includes a spectral response appliance configured to be coupled to a wireless access point (WAP) device that receives frequency-domain data associated with signals from a wireless device during a time period. The spectral response appliance is configured to determine multiple frequency-domain magnitudes associated with the frequency-domain data for the time period to define a spectral magnitude signature associated with the frequency-domain data. The spectral response appliance is configured to identify a spectral response deviation associated with the spectral magnitude signature and is configured to send a parameter indicator associated with a wireless communications parameter based on the spectral response deviation.

As used herein, "associated with" can mean, for example, included in, physically located with, a part of, and/or operates or functions as a part of Additionally, "associated with" can mean, for example, references, identifies, characterizes, describes, and/or sent from. For example, a frequency-domain magnitude can be associated with a frequency bin and identifies, references and/or relates to the frequency bin. Similarly, a frequency bin can be associated with a frequency-domain data and can be said to identify, reference and/or relate to the frequency-domain data.

As used in this specification, the singular forms "a," "an" and "the" include plural referents unless the context clearly dictates otherwise. Thus, for example, the term "a compute device" is intended to mean a single compute device a combination of compute devices.

FIG. 1 is a schematic illustration of a spectral response appliance according to an embodiment, coupled to and in communication with multiple WAP devices disposed within a compute environment. As shown in FIG. 1, a spectral response appliance 100 can be operatively coupled to and in communication with multiple WAP devices 102, 104 and 106 disposed within or near a compute environment. The spectral response appliance 100 can communicate with the WAP devices 102, 104, 106 with a wired or wireless connection. The compute environment can be, for example, a large room or space, such as, a warehouse or a large convention center where the space lacks or has limited interior barriers; within a building with extensive barriers, such as walls; outside in a rural area (e.g., where limited or no buildings or structures are present); or outside within a metropolitan area (e.g., having extensive buildings and other structures). As described above, the spectral response appliance 100 can use data received from the WAP devices 102, 104, 106 to identify the type of compute environment the WAP devices 102, 104, 106 are operating, and based on the type of compute environment, one or more parameter indicators can be sent to the WAP devices 102, 104, 106 indicating that a wireless communications parameter at the WAP device 102, 104, 106 should be changed, as described in more detail below.

The WAP devices 102, 104 and 106 can be, for example, an OFDM receiver device. Although three WAP devices are illustrated in FIG. 1, it should be understood that spectral response appliance 100 can be operatively coupled to, and communicate with, more or less WAP devices. The WAP devices 102, 104, 106 can each communicate with one or more compute devices C1, C2, C3, as shown in FIG. 1. For example, the compute devices C1, C2, C3 can send and receive signals from the WAP devices 102, 104, 106. The WAP devices 102, 104, 106 can provide communication between the multiple compute devices C1, C2, C3 and a network, such as a local area network (LAN), a wide area network WAN), or a network such as, for example, the Internet. The multiple compute devices C1, C2, C3 can be, for example, a tablet device, a netbook computer, a laptop computer, a personal digital assistant (PDA), a cellular telephone, a portable/mobile internet device and/or some other electronic communications device configured to wirelessly communicate with other devices. Although three compute devices are illustrated in FIG. 1, it should be understood that more or less compute devices can communicate with the WAP devices 102, 104, 106.

Figure 2:
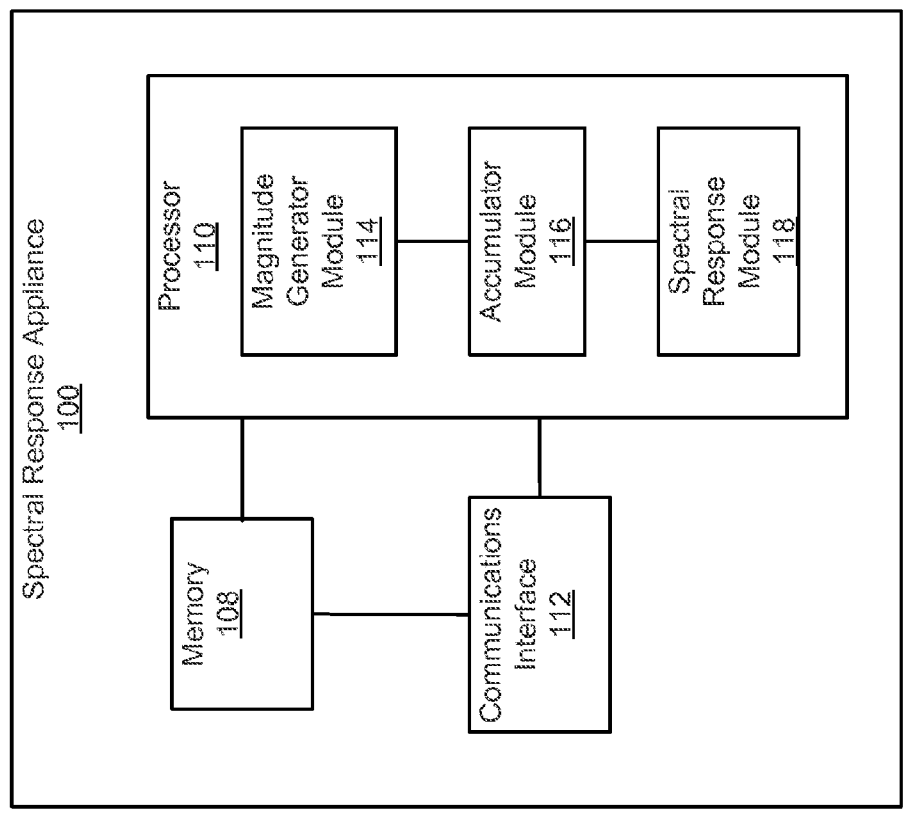
FIG. 2 is a schematic illustration of the spectral response appliance of FIG. 1.

As shown in FIG. 2, the spectral response appliance 100 (also referred to herein as "appliance") can include a processor 110, a memory 108, and a communications interface 112. The processor 110 can include a magnitude generator module 114, an accumulator module 116 and a spectral response module 118. The appliance 100 can include a combination of hardware modules and/or software modules (e.g., stored in memory and/or executing in a processor). Processor 110 can be operatively coupled to memory 108 and communications interface 112. Communications interface 112 can be one or more wired and/or wireless data connections, such as connections conforming to one or more known information exchange standards, such as wired Ethernet, wireless 802.11x ("Wi-Fi"), high-speed packet access ("HSPA"), worldwide interoperability for microwave access ("WiMAX"), wireless local area network ("WLAN"), Ultra-wideband ("UWB"), Universal Serial Bus ("USB"), Bluetooth®, infrared, Code Division Multiple Access ("CDMA"), Time Division Multiple Access ("TDMA"), Global Systems for Mobile Communications ("GSM"), Long Term Evolution ("LTE"), broadband, fiber optics, telephony, and/or the like.

Memory 108 can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

The processor 110 can be any of a variety of processors. Such processors can be implemented, for example, as hardware modules such as embedded microprocessors, Application-Specific Integrated Circuits ("ASICs"), and Programmable Logic Devices ("PLDs"). Some such processors can have multiple instruction executing units or cores. Such processors can also be implemented as one or more software modules (e.g., stored in memory and/or executing in a processor) in programming languages such as, for example, Java™, C++, C, assembly, a hardware description language, or any other suitable programming language. A processor according to some embodiments includes media and computer code (also can be referred to as code) specially designed and constructed for the specific purpose or purposes. In some embodiments, the processor 110 can support standard HTML, and software languages such as, for example, JavaScript, JavaScript Object Notation (JSON), Asynchronous JavaScript (AJAX).

In some embodiments, the processor 110 can be, for example, a single physical processor such as a general-purpose processor, an ASIC, a PLD, or a FPGA having a single processing core or a group of processing cores. Alternatively, the processor 110 can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In yet other alternatives, the processor 110 can be a group of distributed processors (e.g., computing devices with one or more physical processors) operatively coupled one to another via a separate communications network (not shown). Thus, the processor 110 can be a group of distributed processors in communication one with another via a separate communications network (not shown). In some embodiments, a processor can be a combination of such processors. For example, a processor can be a group of distributed computing devices, where each computing device includes a group of physical processors sharing a memory bus and each physical processor includes a group of processing cores.

Figure 3:
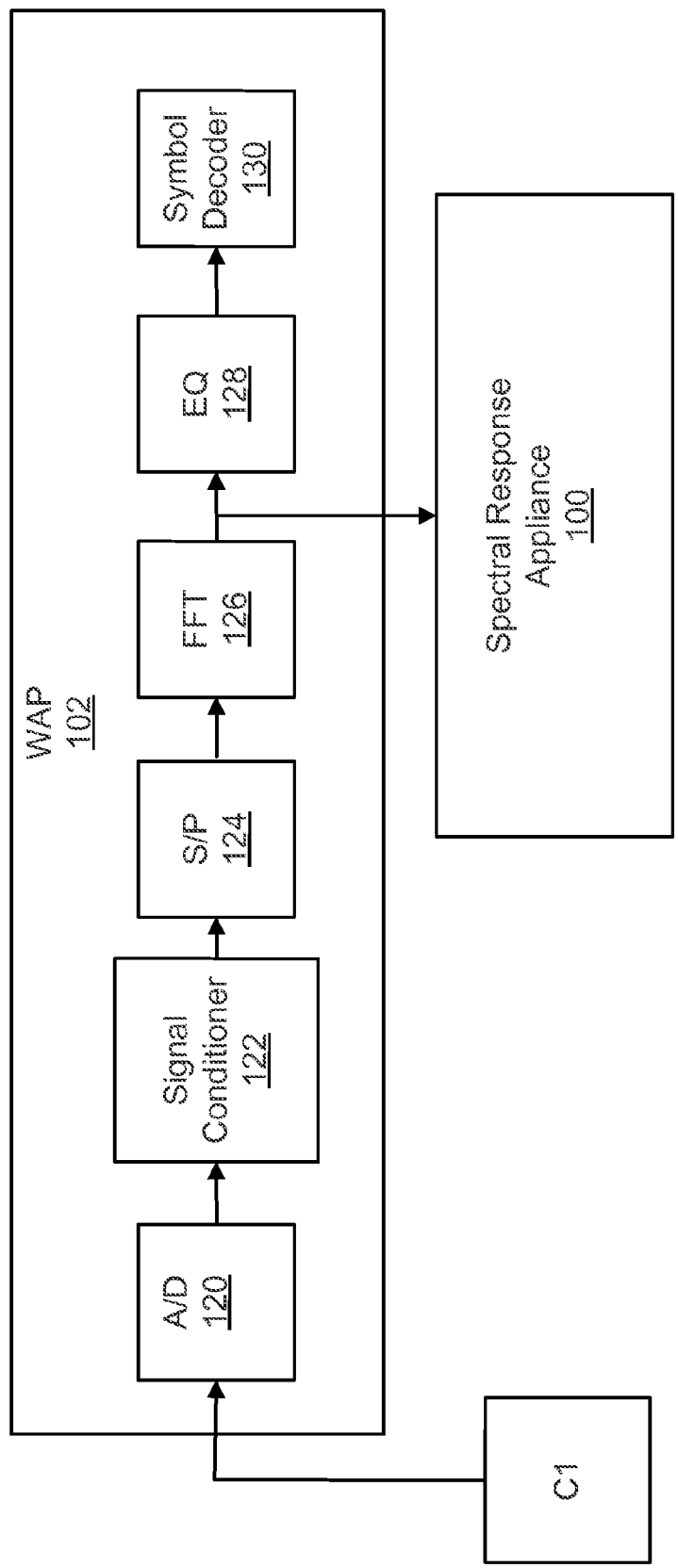
FIG. 3 is a schematic illustration of the spectral response appliance, a wireless access point device and a compute device of FIG. 1.

FIG. 3 is a system block diagram illustrating details of the WAP device 102, and the spectral response appliance 100 and compute device C1 operatively coupled to the WAP device 102. WAP device 102 can include a processor operatively coupled to a memory, and a communications interface (each not shown in FIG. 3). WAP device 102 can communicate with other WAP devices (e.g., 104, 106), and/or the appliance 100 and/or other appliances (not shown) and/or multiple compute devices (e.g., C1, C2, C3) via its communications interface. The processor and memory of WAP device 102 can be the same as or similar to the processor 110 and memory 108 described above, but without the magnitude generator 114, accumulator 116 and spectral response module 118. WAP devices 104 and 106 can also include a processor, memory and communications interface, and other components shown and described for WAP device 102. As shown in FIG. 3, the WAP device 102 also includes an analog to digital (A/D) converter 120, a signal conditioner 122, a serial to parallel (S/P) converter 124, a fast Fourier transfer (FFT) integrated circuit, an equalizer 128 and a symbol decoder 130, all of which can be implemented in the processor and/or memory.

In use, the WAP device 102 can receive signals (e.g., RF signals) from the compute device C1 (and possibly other compute devices) operating within the compute environment. The signals received at the WAP device 102 from the wireless device C1 can be converted from analog to digital at the A/D converter 120. The signals output from the A/D converter 120 can be then processed at the signal conditioner 122. For example, the signals output from the A/D converter 120 can be synchronized and a cyclic prefix can be removed. The signals output from the signal conditioner 122 can then be converted from serial to parallel at the S/P converter 124 and passed to the FFT integrated circuit 126.

As described above, radio signal reflections, known as multipath distortion, can cause frequency-selective fading, which can be represented in the output of the FFT integrated circuit 126 as attenuation of some subcarriers relative to others. The equalizer 128 can typically compensate for such attenuation to recover the digital data and send the signal to the symbol decoder 130. Thus, the signals (i.e., frequency-domain data) received at the WAP device 102 from the compute device C1 are sent to the equalizer 128 to be equalized and then transferred to the symbol decoder 130. At the symbol decoder 130, the signals received from the equalizer 128 can be compressed and error correction coding can be added. As described in more detail below, the spectral response appliance 100 can also receive frequency-domain data (that includes the frequency-selective fading data) from the output of the FFT integrated circuit 126 prior to equalization at the equalizer 128, and use the frequency-domain data to determine a type of compute environment in which the compute device C1 (and possibly other compute devices, such as, e.g., C2 C3) is operating based on a spectral response deviation identified in the signals, as described in more detail below The magnitude generator module 114, the accumulator module 116 and the spectral response module 118 of the appliance 100 can each be any valid combination of hardware and/or software (stored in software and/or executing on hardware) collectively configured to determine the type of compute environment in which the WAP device 102 (and WAP devices 104, 106) is operating (based on the frequency-domain data received from the WAP device 102 (and WAP devices 104, 106). Specifically, frequency-domain data associated with signals received at the WAP device 102 from the compute device C1 during a time period can be received at the magnitude generator module 114. As described above, the appliance 100 receives the frequency-domain data at the output of the FFT integrated circuit 126. The magnitude generator module 114 can determine multiple frequency-domain magnitudes associated with the frequency-domain data for the time period. For example, each frequency-domain magnitude from multiple frequency-domain magnitudes can be uniquely associated with a frequency bin from multiple mutually-exclusive frequency bins associated with the frequency domain data received from the WAP device 102. The accumulator module 116 can then generate a spectral magnitude signature associated with the frequency-domain data based on the multiple frequency-domain magnitudes. For example, the accumulator module 116 can generate a table (not shown) representative of a graph of magnitude versus frequency for each frequency bin associated with the frequency-domain data. The table generated by the accumulator module 116 can be stored in the memory 108 of the appliance 100. For example, the stored table can include a frequency indicator associated with each of the frequency bins from the multiple mutually-exclusive frequency bins, and a magnitude value associated with each frequency indicator from the multiple frequency indicators.

The spectral response module 118 can then identify a spectral response deviation based on the spectral magnitude signature associated with the frequency-domain data generated at the accumulator module 116. For example, as discussed above, OFDM modulation at a WAP device gives a random quality to the magnitude values of each subcarrier (also referred to as subcarrier frequency or frequency bin) over time, so the frequency-domain magnitudes from the accumulator module 116 can be approximately or substantially equal by the time the frequency-domain data has been entirely received. Frequency-selective fading as discussed above can be indicated by deviations from this ideal of equal spectral magnitudes. Thus, as used here, a spectral response deviation is synonymous with or the same as the frequency-selective fading deviation. The spectral response module 118 can use a spectral feature extractor to output numeric values that represent the location and depth of the spectral nulls or magnitude decreases as a function of frequency (also referred to herein as spectral response deviations) found in the output (e.g., the spectral response signature) of the accumulator module 116.

The spectral response deviation can then be combined with other data describing the frequency-domain data, including, for example, the transmitter address of the compute device, the received signal strength indicator (RSSI) of the frequency-domain data, and the time of arrival of the frequency-domain data. This combined data can be used by the spectral response appliance 100, which can compare the combined data to previously-stored models or templates. The spectral response deviations can be treated essentially as additional sensor readings on the same transmitter, but received from different sensors.

After identifying the spectral response deviation associated with the spectral response signature as described above, the spectral response module 118 can use the spectral response deviation to identify a type of compute environment in which the WAP device is operating based on the spectral response deviation. For example, the appliance 100 can generate a first predefined spectral response table including multiple reference spectral response deviations and multiple compute environment types, where each of the reference spectral response deviations is associated with a compute environment type.

To generate the first predefined spectral response table, a reference compute device can be used. For example, a reference compute device can be moved to multiple different locations within several different types of compute environments (e.g., inside with barriers, inside without barriers, outside with barriers, outside without barriers) and communicate with (i.e., send and receive signals) the WAP devices 102, 104, 106 as described above. The appliance 100 can then determine a spectral response deviation associated with the reference compute device based on frequency-domain data received from the WAP devices 102, 104, 106 (as described above) when the reference compute device is located within a particular compute environment. The appliance 100 can then define the first predefined spectral response table that includes multiple reference spectral response deviations and a compute environment type associated with each of the reference spectral response deviations. After the different types of compute environments have been associated with a spectral response deviation, the appliance 100 can associate each type of compute environment with one or more wireless communications parameter indicators. The wireless communications parameters can include, for example, parameters associated with an IEEE 802.11n wireless communications standard. The appliance 100 can generate a second predefined spectral response table that includes multiple types of compute environments and multiple wireless communications parameter indicators. Examples of the first predefined spectral response table and the second predefined spectral response table are described below with respect to FIGS. 8 and 9.

After generating the predefined spectral response tables, when a compute device, such as compute device C1 operates within a particular compute environment, the appliance 100 can use the frequency-domain data received from the WAP devices 102, 104, 106 to determine a spectral response deviation as described above. The appliance 100 can then use the first predefined spectral response table to determine the type of compute environment in which the compute device and the WAP device are disposed based on the identified spectral response deviation. Then based on the compute environment in which the particular WAP device and compute device are disposed, the appliance 100 can use the second predefined spectral response table to identify one or more wireless communications parameters at the WAP device that should be changed.

The appliance 100 can then send a parameter indicator to the WAP device (102, 104, 106) that indicates the type of compute environment in which the WAP device and the compute devices are disposed and/or whether a wireless communications parameter at the WAP device should be changed or adapted to improve performance, for example, to improve or strengthen the signal quality input/output at the WAP device and/or to achieve a greater data transfer rate at the WAP device. For example, based on identification of a spectral response deviation, the appliance 100 can determine that the type of compute environment is a large space without any, or with relatively few interior barriers, such as a warehouse or conference center. In such a compute environment, it may be desirable to change a communications parameter at the WAP devices 102, 104, 106.

A typical WAP device operating in accordance with IEEE 802.11n can be preprogrammed to follow a known adaption sequence or iterative process that can include, for example, a change to a spatial stream quantity, a modulation type and/or a guard interval associated with the signal transmission to and from the WAP device. For example, as shown in the table of FIG. 4, a Modulation and Coding Scheme Index (MCS index) value can be associated with a predetermined set of communications parameters (e.g., spatial stream quantity, modulation type, guard interval, etc.). The WAP device can be preprogrammed to change or adapt to different MCS index values based on the quality of the signals being sent and received at the WAP device. In one example referring to the table of FIG. 4, for a given guard interval (e.g., 800 ns GI) and a given channel (e.g., 20 MHz), as the signal quality weakens, the WAP device may change from a MCS index of 3 to a MCS index of 1 such that the modulation type is changed from 16-QAM to QPSK, but the spatial stream quantity remains at 1, and the data rate changes from 26.00 to 13.00 Mbits/s. In another example, as the signal quality increases, the WAP device may change from a MCS index of 3 to a MCS index of 10, such that the modulation type changes from 16-QAM to QPSK, the spatial stream quantity changes from 1 to 2 and the data rate changes from 26.00 to 39.00 Mbits/s. The WAP device can also change or adapt the guard interval to change the data transmission rate. The WAP device can be preprogrammed to follow a particular sequence of such changes to improve transmission performance.

In contrast to a typical WAP device using a known preprogrammed adaption sequence/iterative process, the appliance 100 can use the spectral response signature to define the predefined spectral response tables (see, e.g., FIGS. 8 and 9) and use those tables to determine an adaption protocol that can be used at the WAP device rather than a traditional iterative process such as described above. Using the spectral data received from the WAP devices 102, 104, 106, the appliance 100 can determine the type of compute environment the WAP device is operating and then based on the type of compute environment, send a parameter indicator to the WAP device(s) indicating that a wireless communications parameter (e.g., spatial stream, modulation type, guard interval) should be changed or adapted to receive the best or better data transmission rate at the WAP device(s). In some embodiments, the appliance 100 can send a parameter indicator that merely indicates that a particular communications parameter should be changed, but does not indicate the value to which the communications parameter should be changed. In some other embodiments, the appliance 100 can provide a parameter indicator that indicates the value to change a particular communications parameter. For example, given a particular compute environment, the appliance 100 can send a parameter indicator to the WAP device(s) indicating that the modulation type should be adapted (e.g., incremented or decremented) before adapting other wireless communication parameters such as the spatial stream or guard interval. Given a different particular compute environment, the appliance 100 can send a different parameter indicator to the WAP device(s) indicating that the guard interval should be adapted (e.g., incremented or decremented) before adapting other wireless communication parameters such as the spatial stream or modulation type.

Figure 5:
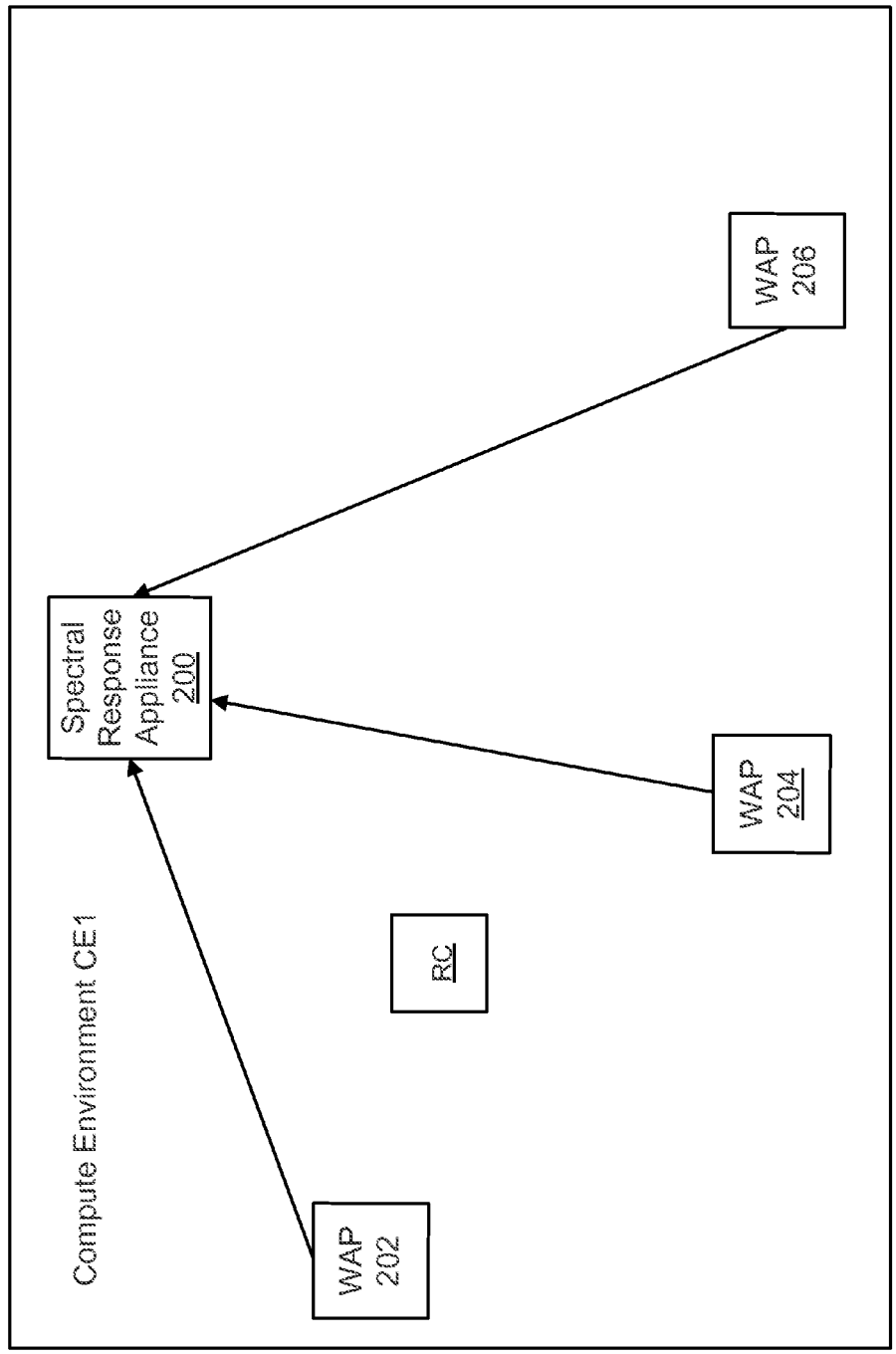
FIG. 5 is a schematic illustration of a spectral response appliance, according to an embodiment, a reference wireless device and multiple wireless access point devices disposed within a compute environment.

FIGS. 5-10 illustrate an example embodiment of a spectral response appliance. A spectral response appliance 200 can be configured the same or similar to, and function the same as or similar to, the appliance 100 described above. The spectral response appliance 200 (also referred to herein as "appliance") can be operatively coupled to and communicate with one or more WAP devices as described above. For example as shown in FIG. 5, the appliance 200 can be coupled to and communicate with a WAP device 202, a WAP device 204 and a WAP device 206 disposed within a compute environment CE1. The WAP devices 202, 204 and 206 can each be configured the same or similar to and function the same as or similar to the WAP devices 102, 104, 106 described above. The compute environment CE1 can be, for example, a large space that lacks or has relatively few interior barriers such as, for example, a warehouse or large conference center or room; a building or other structure having significant interior barriers such as walls; an outside rural area having limited or no barriers or structures; or an outside metropolitan area that has buildings and other structures or barriers. Other type of compute environments can also exist, but are not mentioned here for simplicity.

FIGS. 5-9 illustrate the process of defining a first predefined spectral response table and second predefined spectral response table, as discussed above for appliance 100. As shown in FIG. 5, a reference compute device RC can be used to generate the first predefined spectral response table. The reference compute device RC can be disposed within various different compute environments, and at each of the various compute environments the reference compute device RC can send signals to the WAP devices associated with that compute environment, such as WAP device 202, WAP device 204 or WAP device 206, in compute environment CE1 shown in FIG. 5, depending on the particular reference location of the reference compute device RC and its proximity to the various WAP devices. The reference computer RC can also be taken to other compute environments, such as, for example, a compute environment CE2, a compute environment CE3, and a compute environment CE4 (each not shown but referenced in the first predefined spectral response table in FIG. 8). A WAP device(s) can communicate or send frequency-domain data associated with the reference compute device RC to the appliance 200 at each of the reference compute environments (e.g., CE1, CE2, CE3, CE4 shown in the table in FIG. 8). For example, the appliance 200 can receive the frequency domain data output from a FFT integrated circuit of the WAP device(s), as described above for appliance 100. The frequency-domain data can include frequency-selective fading data as described above, and the appliance 200 can use the frequency-domain data to determine a spectral response deviation associated with the particular compute environment in which the WAP device is disposed, as described below.

More specifically, the appliance 200 can determine a spectral response deviation associated with each of the multiple different locations of the reference compute device RC based on frequency-domain data received from the WAP device(s) (as described above) when the reference compute device RC is located at the multiple different compute environments (e.g., CE1, CE2, CE3, CE4). For example, when the reference compute device RC is disposed within a first compute environment, frequency-domain data associated with signals received at the WAP device(s) from the reference compute device RC during a time period can be received at a magnitude generator module (not shown) of the appliance 200. The magnitude generator module can determine multiple frequency-domain magnitudes associated with the frequency-domain data for the time period.

An accumulator module (not shown) of the appliance 200 can then generate a spectral magnitude signature associated with the frequency-domain data based on the multiple frequency-domain magnitudes. For example, the accumulator module can generate a table (not shown) representative of the spectral response signature. The spectral response signature can also be illustrated in a graph of the frequency-domain magnitudes. For example, FIGS. 6 and 7 each illustrates a different example graph of magnitude versus frequency associated with the frequency-domain data associated with signals received at a WAP 202, 204 and/or 206 from the reference compute device RC when the reference compute device RC is disposed within a particular type of compute environment.

Figure 6:
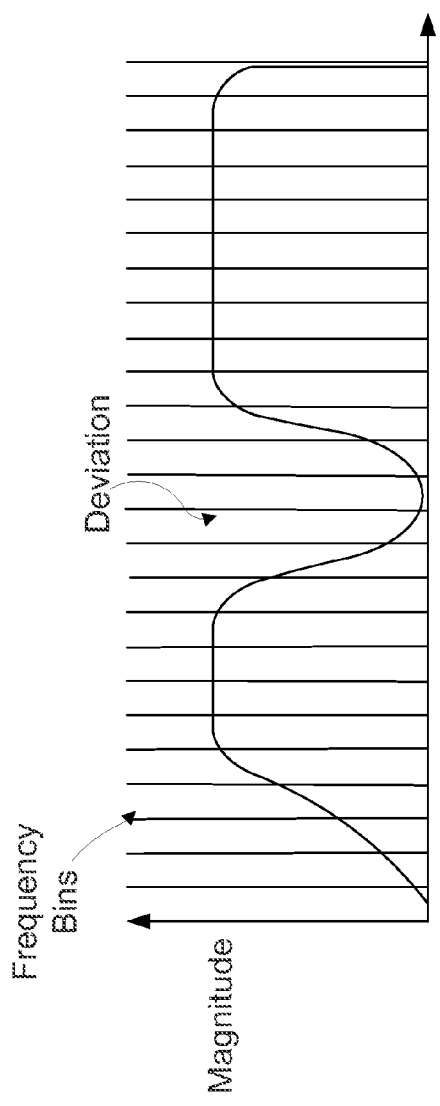
FIGS. 6 and 7 are each an example graph of different embodiments of a spectral response signature.
Figure 7:
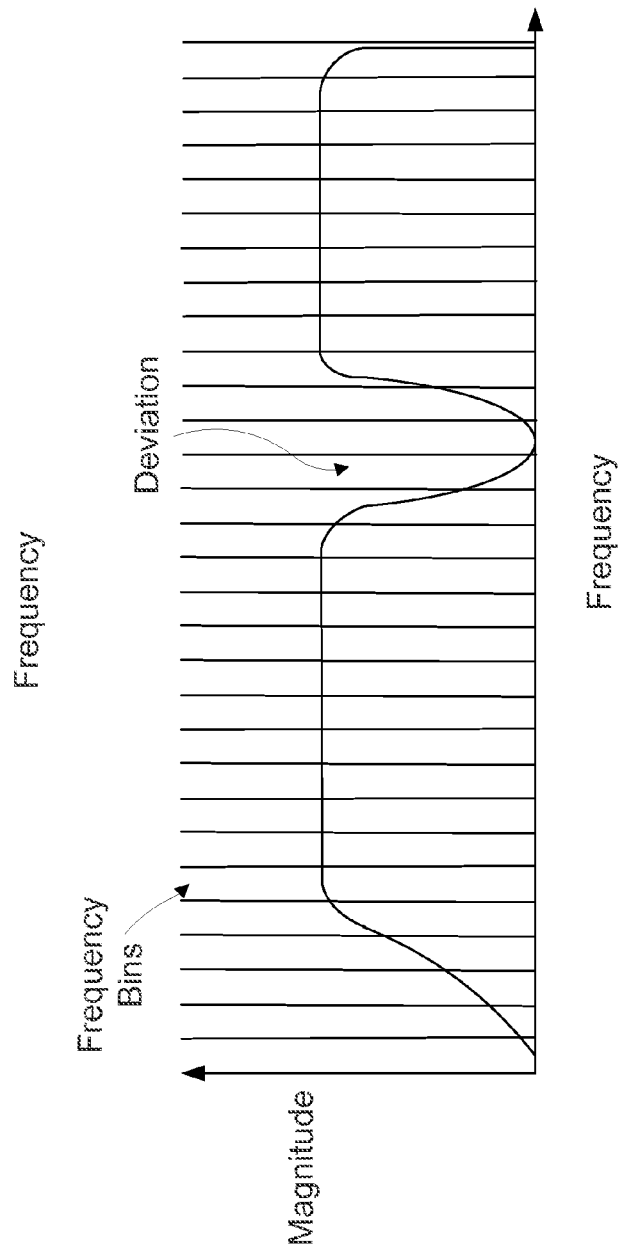

As shown in FIGS. 6 and 7, each frequency-domain magnitude can be uniquely associated with a frequency bin from multiple mutually-exclusive frequency bins associated with the frequency-domain data received from the WAP device(s) for a given time period in which the reference compute device RC is disposed within a particular type of compute environment. The tables (not shown) corresponding to FIGS. 6 and 7 generated by the accumulator module can be stored in the memory (not shown) of the appliance 200 and can include a frequency indicator associated with each of the frequency bins from the multiple mutually-exclusive frequency bins and a magnitude value associated with each frequency indicator from the multiple frequency indicators.

As illustrated in FIGS. 6 and 7, the frequency-domain magnitudes associated with the frequency-domain data are typically substantially equal for a given frequency by the time the frequency-domain data has been entirely received. Where the magnitude deviates from the substantially equal spectral magnitudes, the presence of frequency-selective fading is indicated and can be used to identify a spectral response deviation associated with the frequency-domain data. A spectral response module (not shown) of the appliance 200 includes a spectral feature extractor that can output numeric values that represent the location and depth of the spectral response deviations to generate a first predefined spectral response table 240 shown in FIG. 8. In some cases, where there is very low or no multipath distortion, there may be no spectral response deviation.

The first predefined spectral response table 240 includes values S1-S4 associated with the spectral response deviations identified from the spectral response signature, and a type of compute environment associated with the each of the spectral response deviation. For example, the computer environments in this example include compute environments CE1, CE2, CE3 and CE4. As described above, the compute environment CE1 can be, for example, a large room or space, such as, a warehouse or a large convention center where the space lacks or has limited interior barriers. The compute environment CE2 can be, for example, within a building with extensive interior barriers, such as walls. The compute environment CE3 can be, for example, outside in a rural area (e.g., having limited or no buildings or structures) and the compute environment CE2 can be, for example, outside within a metropolitan area (e.g., having extensive buildings and other structures).

After generating the first predefined spectral response table 240, the appliance 200 can generate a second predefined spectral response table 242 as shown in FIG. 9. The second spectral response table 242 can include one or more communications parameter indicators associated with each of the types of compute environments CE1-CE4 and associated with various communications parameters. For example, a communications parameter indicator GI1 can be associated with a first guard interval such as 800 ns and a communications parameter indicator GI2 can be associated with a second guard interval such as 400 ns. A communications parameter indicator SP1 can be associated, for example, with a spatial stream quantity of 1, and a communications parameter SP2 can be associated, for example, with a spatial stream quantity of 2, shown in FIG. 4. A communications parameter indicator MT1 can be associated, for example, with a modulation type BPSK and a communications parameter MT2 can be associated with a modulation type QPSK, shown in FIG. 4.

Figure 10:
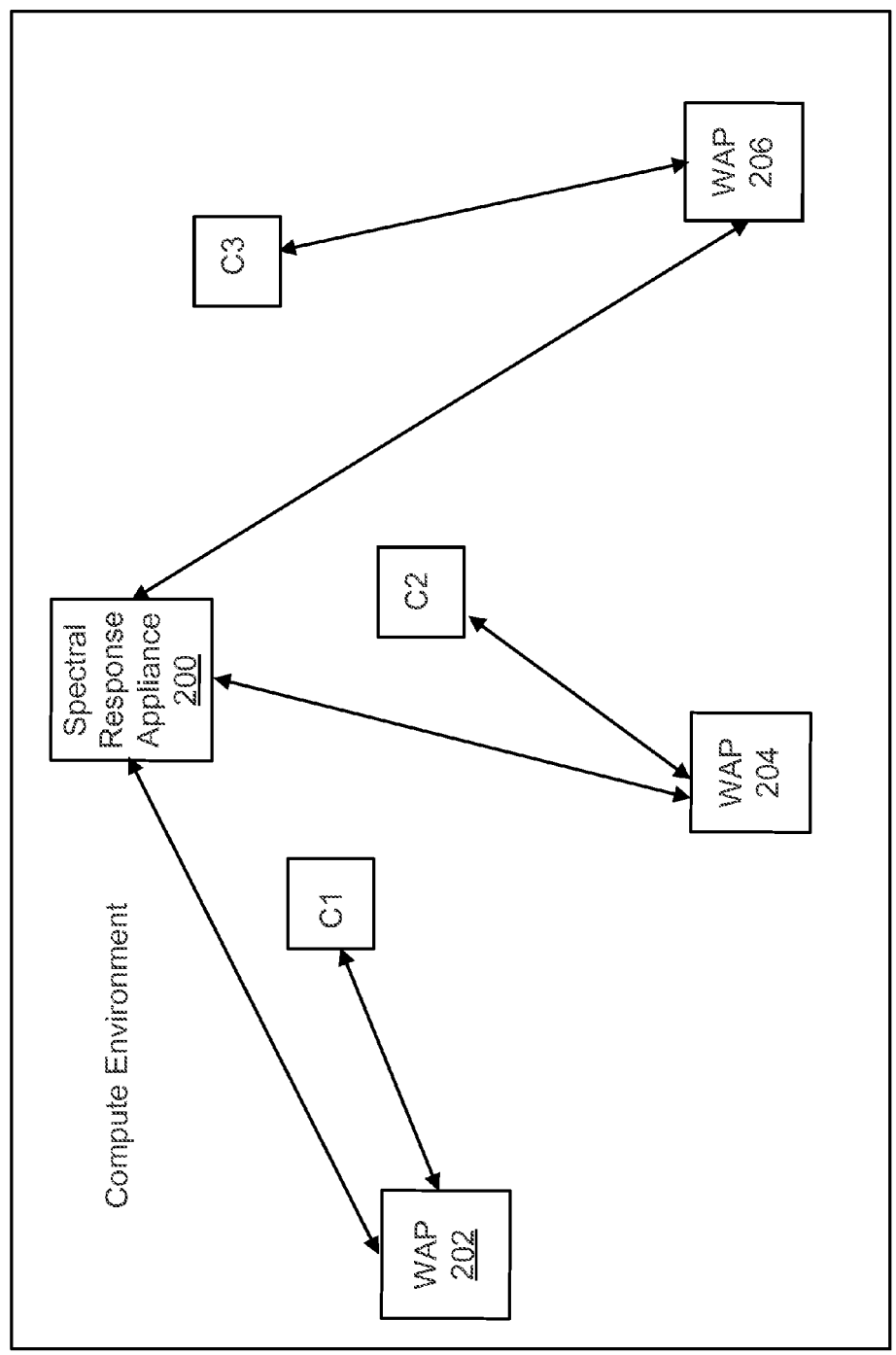
FIG. 10 is a schematic illustration of the spectral response appliance and wireless access point devices of FIG. 5 and multiple compute devices within the compute environment of FIG. 5.

During use, when a compute device, such as compute devices C1-C3, shown in FIG. 10, are subsequently moved within the compute environment CE1 in this example, the appliance 200 can use the frequency-domain data received from the WAP device(s) 202, 204, 206 to determine a spectral response deviation for a given compute device C1-C3 at a given time period. The appliance 200 can then use the first predefined spectral response table to determine the type of compute environment (e.g., CE1, CE2, CE3, CE4) in which the WAP device is located based on the identified spectral response deviations for the compute devices. For example, for compute device C2, the appliance 200 can identify a spectral response deviation based on the frequency domain data received from the WAP device (e.g., 202, 204, 206) from the compute device C2 as previously described. In this example, if the spectral response deviation associated with compute device C2 is determined to be one of S1-S4, the spectral response module of the appliance 200 can use the first predefined spectral response table 240 to identify the type of compute environment in which the compute device (and/or WAP devices) is operating, based on the identified spectral response deviation. For example, the compute environment can be a compute environment CE1, CE2, CE3 or CE4 as shown in FIG. 8. The appliance 200 can then use the second spectral response table 242 to determine if a wireless communications parameter at the particular WAP device should be changed. For example, as shown in FIG. 9, if the compute environment is determined to be a compute environment CE1, this may indicate that multipath distortion is present. In such a compute environment, the appliance 200 can send a parameter indicator SP1 to the WAP device to indicate that a spatial steam quantity at the WAP device should be changed to a spatial stream quantity of 1 (in this example as described above), rather than changing a modulation type value, to increase transmission performance at the WAP device. In addition, in such a compute environment, the compute environment CE1 can indicate that time-domain smearing is present. In that case, the appliance 200 may also send a parameter indicator GI1 to the WAP device indicating that a conventional guard interval value of 800 ns (rather than 400 ns) should be used. In other words, rather than referring to a preprogrammed iterative process at the WAP device as described above (e.g., changing a MCS index value which can include changing a spatial stream quantity and/or modulation type), the appliance 200 can send one or more parameter indicators to the WAP device indicating specific changes to the wireless communications parameter(s) that should be made.

In another example, if the compute environment is determined to be a compute environment CE4, this may indicate that little to no multipath distortion is present. In such a compute environment, the appliance 200 can send a communications parameter indicator MT2 to the WAP device to indicate that a modulation type value at the WAP device should be changed to modulation type QPSK (in this example as described above) such that signal quality at the WAP device is increased. In addition, in such a compute environment, the compute environment CE4 may indicate that little or no time-domain smearing is present. In that case, the appliance 200 can also send a parameter indicator GI2 to the WAP device indicating that a guard interval value of 400 ns (rather than 800 ns) should be used.

In an alternative embodiment, the second predefined spectral response table can include communications parameter indicators that are not specific. For example, an alternative second predefined spectral response table (not shown) can include a communications parameter indicator GI generically associated with a guard interval parameter, a communications parameter indicator SP generically associated with a spatial stream quantity parameter, and a communications parameter indicator MT generically associated with a modulation type parameter. As described above, in such an embodiment, the appliance can send a parameter indicator to the WAP device indicating that a parameter should be changed, but not provide the specific parameter value.

In alternative embodiments, a spectral response appliance can determine the type of compute environment and whether one or more wireless communications parameters at a WAP device(s) should be changed based on 1) a single predefined spectral response table, 2) algorithms and formulas based on the spectral response deviation(s), or 3) a combination of tables and formulas. For example, in one alternative embodiment, a spectral response appliance can generate a single spectral response table that includes multiple spectral response deviations (e.g., S1, S2, S3, S4) as described above for the first spectral response table 240, and one or more communications parameter indicators (e.g., SP1, SP2, MT1, MT2, GI1, GI2) associated with each of the spectral response deviations. In another alternative embodiment, a spectral response appliance can generate a single spectral response table that includes multiple compute environment types (e.g., CE1, CE2, CE3, CE4) and one or more communications parameter indicators (e.g., SP1, SP2, MT1, MT2, GI1, GI2) associated with each of the compute environments. In such an embodiment, the spectral response appliance can, for example, determine the compute environment type using a formula based on the spectral response deviation(s) identified with a reference computer as described above.

Figure 11:
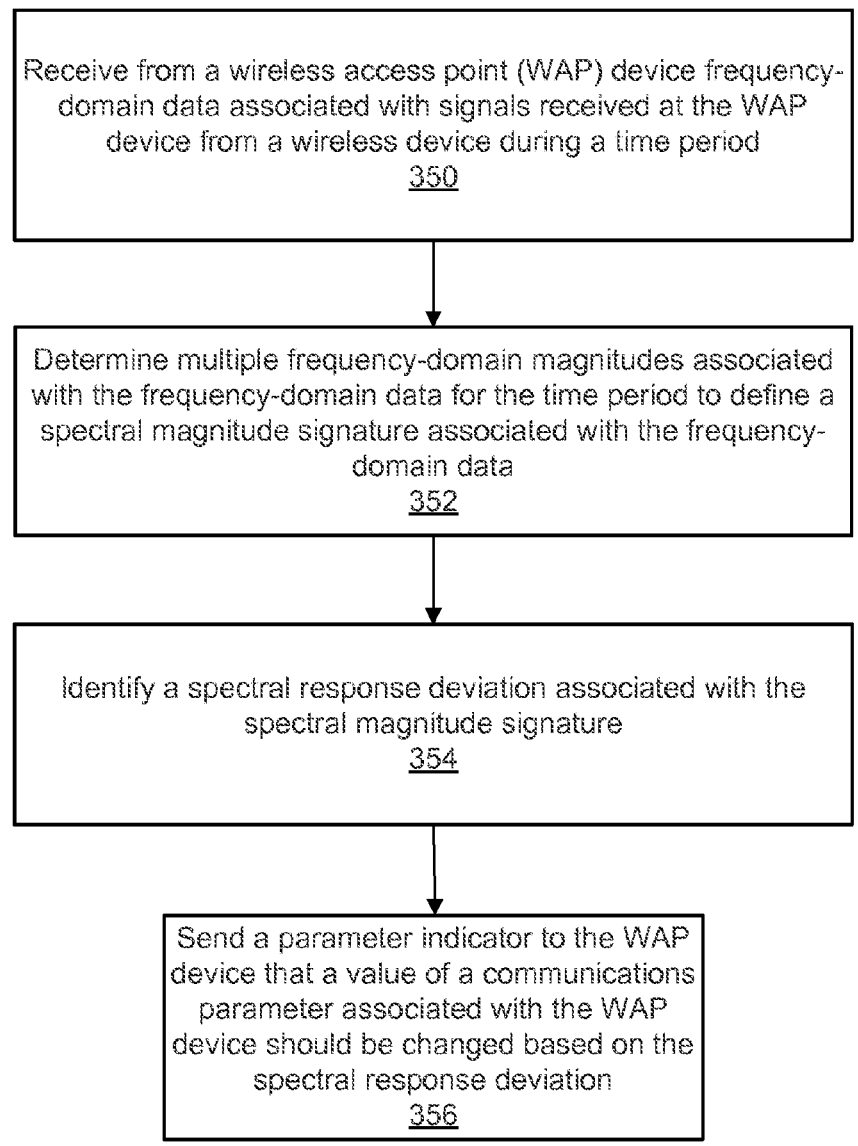
FIG. 11 is a flowchart illustrating a method of determining whether a wireless communications parameter at a wireless access point device should be changed, according to an embodiment.

FIG. 11 is a flowchart illustrating a method of determining a location of a wireless device within a compute environment, according to an embodiment. The method includes at 450, receiving from a wireless access point (WAP) device, frequency-domain data associated with signals received at the WAP device from a wireless device during a time period. At 452, multiple frequency-domain magnitudes associated with the frequency-domain data for the time period are determined to define a spectral magnitude signature associated with the frequency-domain data. Each frequency-domain magnitude from the multiple frequency-domain magnitudes can be uniquely associated with a frequency bin from multiple mutually-exclusive frequency bins associated with the frequency domain data. At 454, a spectral response deviation associated with the spectral magnitude signature can be identified. At 456, based on the spectral response deviation, a parameter indicator associated with a wireless communications parameter can be sent to the WAP device or to a user of the spectral response appliance indicating that a wireless communications parameter at the WAP device should be changed.

Figure 12:
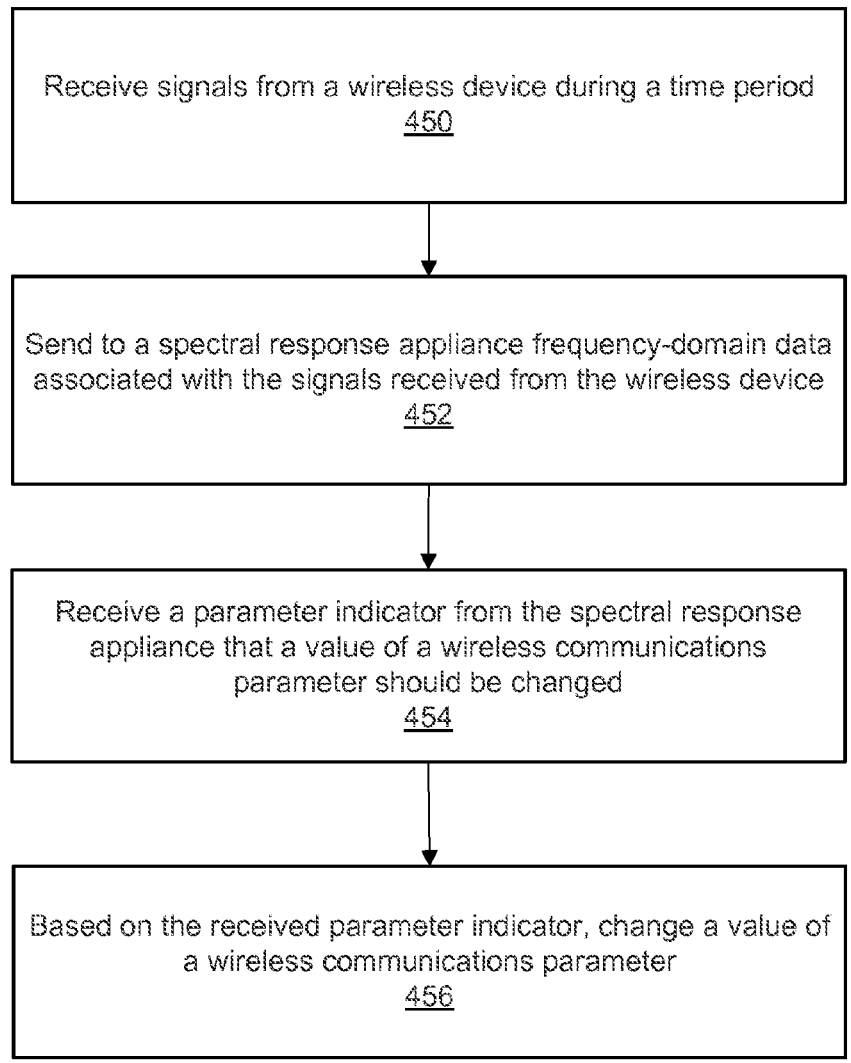
FIG. 12 is a flowchart illustrating a method of configuring an access point device based on a communication from a spectral response appliance, according to an embodiment.

FIG. 12 is flowchart illustrating a method of changing a value of a communications parameter at a WAP device based on a spectral response deviation determined by a spectral response appliance as described above. At 550, signals can be received at a WAP device from one or more wireless devices. At 552, frequency-domain data associated with the signals received from the wireless device can be sent to the spectral response appliance. At 554, a parameter indicator indicating that a value of a wireless communications parameter should be changed can be received at the WAP device. At 556, based on the received parameter indicator, a value of the wireless communications parameter can be changed at the WAP device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
   receive from a wireless access point (WAP) device frequency domain data associated with signals received at the WAP device from a wireless device during a time period;
   determine a plurality of frequency-domain magnitudes associated with the frequency-domain data for the time period to define a spectral magnitude signature associated with the frequency-domain data, each frequency-domain magnitude from the plurality of frequency-domain magnitudes being uniquely associated with a frequency bin from a plurality of mutually-exclusive frequency bins associated with the frequency domain data;
   identify a spectral response deviation associated with the spectral magnitude signature; and
   send a parameter indicator to the WAP device based on the spectral response deviation such that a wireless communications parameter value at the WAP device is changed.

2. The non-transitory processor-readable medium of claim 1, wherein the code to define the spectral magnitude signature associated with the frequency-domain data includes code to store a plurality of frequency indicators, each frequency indicator from the plurality of frequency indicators being associated with each frequency bin from the plurality of mutually-exclusive frequency bins and a magnitude value.

3. The non-transitory processor-readable medium of claim 1, wherein the code to receive from the WAP device frequency-domain data includes code to receive data output from a fast Fourier transfer (FFT) integrated circuit of the WAP device.

4. The non-transitory processor-readable medium of claim 1, wherein the parameter indicator is a first parameter indicator, the non-transitory processor-readable medium further comprising code to:
generate a spectral response table including a plurality of compute environment types and a plurality of parameter indicators, each parameter indicator from the plurality of parameter indicators being associated with a wireless communications parameter, the plurality of parameter indicators including the first parameter indicator; and
prior to sending the first parameter indicator to the WAP device, identify the first parameter indicator based on the spectral response table and the spectral response deviation.

5. The non-transitory processor-readable medium of claim 1, wherein the parameter indicator is a first parameter indicator, the non-transitory processor-readable medium further comprising code to:
generate a first predefined spectral response table including a plurality of reference spectral response deviations and a plurality of compute environment types, each spectral response deviation from the plurality of spectral response deviations being associated with a computer environment type from the plurality of compute environment types;
generate a second predefined spectral response table including the plurality of compute environment types and a plurality of parameter indicators including the first parameter indicator, each parameter indicator from the plurality of parameter indicators being associated with a wireless communications parameter; and
prior to the sending the first parameter indicator to the WAP device, identify the first parameter indicator based on the first response table, the second spectral response table and the spectral response deviation.

6. The non-transitory processor-readable medium of claim 1, wherein the parameter indicator is related to a parameter associated with an IEEE 802.11 wireless communications standard.

7. The apparatus of claim 1, wherein the parameter indicator is related to a parameter associated with at least one of a spatial stream quantity, a modulation type or a data rate.

8. An apparatus, comprising:
a spectral response appliance configured to be coupled to a wireless access point (WAP) device that receives from a wireless device signals during a time period, the spectral response appliance configured to receive from a fast Fourier transfer (FFT) integrated circuit of the WAP device frequency-domain data associated with the signals received by the WAP device from the wireless device,
the spectral response appliance including a spectral response module configured to identify a spectral response deviation associated with the frequency-domain data received from the FFT integrated circuit and send a parameter indicator based on the spectral response deviation such that the WAP device changes a wireless communications parameter value in response to the indicator.

9. The apparatus of claim 8, wherein the parameter indicator is related to a parameter associated with an IEEE 802.11n wireless communications standard.

10. The apparatus of claim 8, wherein the parameter indicator is related to a parameter associated with at least one of a spatial stream quantity, a modulation type or a data rate.

11. The apparatus of claim 8, wherein the spectral response appliance includes a magnitude generator module configured to determine a plurality of frequency-domain magnitudes associated with the frequency-domain data for the time period, each frequency-domain magnitude from the plurality of frequency-domain magnitudes being uniquely associated with a frequency bin from a plurality of mutually-exclusive frequency bins associated with the frequency-domain data.

12. The apparatus of claim 8, wherein the spectral response appliance includes a magnitude generator and an accumulator module,
the magnitude generator module configured to determine a plurality of frequency-domain magnitudes associated with the frequency-domain data for the time period, each frequency-domain magnitude from the plurality of frequency-domain magnitudes being uniquely associated with a frequency bin from a plurality of mutually-exclusive frequency bins associated with the frequency-domain data,
the accumulator module configured to generate a spectral magnitude signature associated with the frequency-domain based on the plurality of frequency-domain magnitudes, the spectral response module configured to identify the spectral response deviation based on the spectral magnitude signature.

13. The system of claim 8, wherein the parameter indicator is a first parameter indicator, the spectral response module is configured to generate a predefined spectral response table including a plurality of compute environment types and a plurality of parameter indicators, the plurality of parameter indicators including the first parameter indicator, each parameter indicator from the plurality of parameter indicators being associated with a wireless communications parameter, each compute environment type from the plurality of compute environment types being associated with a parameter indicator from the plurality of parameter indicators.

14. The system of claim 8, wherein the parameter indicator is a first parameter indicator, the spectral response module is configured to generate a first predefined spectral response table including a plurality of spectral response deviations and a plurality of compute environments, and a second spectral response table including the plurality of compute environment types and a plurality of parameter indicators, the plurality of parameter indicators including the first parameter indicator, each parameter indicator from the plurality of parameter indicators being associated with a wireless communications parameter, each spectral response deviation from the plurality of spectral response deviations associated with a compute environment type from the plurality of compute environment types.

15. An apparatus, comprising:
a spectral response appliance configured to be coupled to a wireless access point (WAP) device that receives frequency-domain data associated with signals from a wireless device during a time period,
the spectral response appliance configured to determine a plurality of frequency-domain magnitudes associated with the frequency-domain data for the time period to define a spectral magnitude signature associated with the frequency-domain data,
the spectral response appliance configured to identify a spectral response deviation associated with the spectral magnitude signature, the spectral response appliance configured to send a parameter indicator associated with a wireless communications parameter based on the spectral response deviation.

16. The apparatus of claim 15, wherein the indicator is related to a wireless communications parameter associated with an IEEE 802.11n wireless communications standard.

17. The apparatus of claim 15, wherein the indicator is related to a wireless communications parameter including at least one of a spatial stream quantity, a modulation type or a data rate.

18. The apparatus of claim 15, wherein:
each frequency-domain magnitude from the plurality of frequency-domain magnitudes is uniquely associated with a frequency bin from a plurality of mutually-exclusive frequency bins associated with the frequency domain data,
the spectral response appliance is configured to store (1) a frequency indicator associated with each frequency bin from the plurality of mutually-exclusive frequency bins, and (2) a magnitude value associated with each frequency indicator from the plurality of frequency indicators,
the spectral response appliance is configured to identify the spectral response deviation associated with the spectral magnitude signature based on (1) the frequency indicator for each frequency bin from the plurality of mutually-exclusive frequency bins and (2) the magnitude value associated with each frequency indicator from the plurality of frequency indicators.

19. The apparatus of claim 15, wherein the spectral response appliance is configured to receive the frequency-domain data output from a fast Fourier transfer (FFT) integrated circuit of the WAP device.

20. The apparatus of claim 15, wherein the parameter indicator is a first parameter indicator,
the spectral response appliance is configured to generate a first predefined spectral response table including a plurality of reference spectral response deviations and a plurality of compute environments types, and a second predefined spectral response table including the plurality of compute environment types and a plurality of parameter indicators, the plurality of parameter indicators including the first parameter indicator, each parameter indicator from the plurality of parameter indicators being associated with a wireless communications parameter, each reference spectral response deviation from the plurality of reference spectral response deviations associated with a compute environment type from the plurality of compute environment types; and
the spectral response appliance is configured to identify, prior to sending the first parameter indicator, the first parameter indicator based on the second spectral response table and the spectral response deviation.

* * * * *